United States Patent [19]

Gregoris et al.

[11] Patent Number: 4,762,735

[45] Date of Patent: Aug. 9, 1988

[54] INTEGRATED OPTICS SPECTRUM ANALYZER

[75] Inventors: Dennis J. Gregoris; Roger Arsenault; Velimir M. Ristic, all of Toronto, Canada

[73] Assignee: Her Majesty the Queen in Right of Canada, as represented by the Minister of National Defence, Ottawa, Canada

[21] Appl. No.: 129,506

[22] Filed: Dec. 7, 1987

Related U.S. Application Data

[62] Division of Ser. No. 38,095, Apr. 13, 1987.

[30] Foreign Application Priority Data

Apr. 25, 1986 [CA] Canada .................................. 507667

[51] Int. Cl.⁴ .............................................. G02B 6/12
[52] U.S. Cl. .................................. 427/162; 350/96.11; 350/96.12; 350/96.13
[58] Field of Search ..................... 427/162; 350/96.11, 350/96.12, 96.13

[56] References Cited

U.S. PATENT DOCUMENTS 4,056,304 11/1977 Phillips ............................... 427/162

FOREIGN PATENT DOCUMENTS 0000184 1/1979 Japan .................................. 427/162

Primary Examiner—Sam Silverberg
Attorney, Agent, or Firm—Sheldon Kanars; John T. Rehberg

[57] ABSTRACT

An optical waveguide comprises two out-diffused optical waveguide sections an in-diffused optical waveguide section, and two narrow transition region intimately connecting the out-diffused waveguide sections and the in-diffused waveguide section. This waveguide structure can decrease the level of in-plane scattering caused by surface irregularities and reduce the difficulty of coupling light into and out of the waveguide. The structure can be made to perform as a transverse magnetic mode filter and increase the intensity of light focussed into the guide beyond the limits imposed by the optical damage resistance of a strictly in-diffused waveguide.

4 Claims, 1 Drawing Sheet

INTEGRATED OPTICS SPECTRUM ANALYZER

This application is a division of application Ser. No. 38,095, filed Apr 13, 1987.

BACKGROUND OF THE INVENTION

1. Field of the Invention

The present invention relates, in general, to an improved optical waveguide and method of making same and, in particular, to an improved signal processing device such as an Integrated Optical Spectrum Analyzer.

2. Description of the Prior Art

Optical waveguides formed by the thermal in-diffusion of titanium into the surface of Lithium Niobate ($LiNbO_3$) crystals have become the basis for numerous advanced optical guided wave signal processing devices such as the integrated optics spectrum analyzer (IOSA).

Titanium in-diffused waveguides are capable of propagating optical waves with little attenuation in a region very close (within 3 μm) to the crystal surface where the optical beam can interact efficiently with high frequency surface acoustic waves (SAW) through the acousto-optic effect or with electric fields generated by metal surface electrodes via the electro-optic effect. However, several problems attend the close proximity of the guided wave to the surface of the crystal.

Surface roughness, micro-scratches and contamination can increase the amount of in-plane scattering and thereby reduce the dynamic range of the signal processor. Coupling light efficiently into and out of the waveguide is also more difficult to achieve when the waveguide is tightly confined to the crystal surface. Laser diodes, which are often the light sources for optical guided wave signal processors, have highly divergent beams which necessitate extremely accurate and close positioning between the active region of the diode and the well polished edge of the waveguide. Conversely, guided beams exiting the waveguide diverge quickly and, therefore, precise butt coupling of a detector to the waveguide edge is essential in order to capture the maximum amount of light.

Titanium in-diffused waveguides in $LiNbO_3$ can propagate transverse electric (TE) and transverse magnetic (TM) polarized modes simultaneously. The simultaneous presence of two types of modes leads to the deterioration of the performance of geodesic lenses since the lenses will exhibit a different focal length for each mode type. Furthermore, geodesic lenses, needed either for collimating or focussing, operate with light rays at large angles (65°–90°) with respect to the optical axis of $LiNbO_3$. In this region, both TE and TM modes are leaky modes with TE modes being dominant. It is desirable to eliminate TM modes in order to suppress the occurrence of double focussing in the detector region and reduce the noise floor, and, thus, improve the dynamic range of the device.

Finally, these waveguides are susceptible to optical damage at high optical power densities especially for visible light wavelengths. This usually occurs at the input coupling region where the light beam often has its smallest cross-section. Consequently, the maximum amount of optical power than can be coupled into the guide is restricted to the damage threshold.

The problem of in-plane scattering caused by surface irregularities in the planar in-diffused waveguides has not yet been solved in a clear and consistent manner. However, careful control of several factors in the waveguide preparation has been shown to reduce the level of scattering. These factors include: the thickness of the pre-diffusion titanium layer on the crystal, the duration and temperature of the diffusion and the influx of argon and oxygen gases during the diffusion. Careful surface polishing may also aid in lowering scattering but this is not always successful or consistent.

A variety of techniques have been developed for coupling light into the in-diffused waveguides. Some of the more efficient techniques include: the direct butt-coupling of a laser diode to a polished waveguide edge and the use of lenses to focus the light onto the polished edge. Both methods require very precise positioning of the optical elements relative to the waveguide edge.

Elimination of TM polarized waveguide modes can be accomplished with a tapered transitional waveguide situated between a high refractive index and a low refractive index waveguide while ensuring the guided beam is incident at the transition junction at the Brewster angle. Methods for removing TM modes propagated in the geodesic lenses have not as yet been published.

The problem of optical damage in $LiNbO_3$ in-diffused waveguides has not been solved for visible light wavelengths, although doping the crystal with MgO during manufacture or adding water vapour to the argon gas during in-diffusion have been reported to help.

The previous proposed solutions to the planar scattering problem are neither definitive nor necessarily consistent when implemented because of the many variables involved in waveguide fabrication processes, while solutions to the non-planar scattering have yet to be put forward.

The coupling problem has not been solved in an optimal sense. Although efficient edge coupling of light to the waveguide can be attained, it is at the cost of greater complexity and precision since the available coupling region is only 3 μm thick. Direct coupling of a laser diode or photodetector results in a compact device but it is a difficult task in practice. On the other hand, while the use of focussing optics makes the positioning requirements less stringent, they increase the size and bulk of the signal processor.

Removal of filtering or TM modes by means of transitional waveguides is complicated and impractical in practice. Furthermore, imperfect waveguide matching may cause unacceptably high levels of scattering loss. Solutions to the problem with TM modes in geodesic lenses have not yet been advanced.

Techniques for increasing, in the visible light range, the optical damage resistance in titanium in-diffused waveguides have been successful but the resistance is still lower than that of out-diffused waveguides in $LiNbO_3$.

In general, if all the previously described solutions were incorporated into a single guided wave signal processing device, the complexity and cost of such a device would likely increase and the production yield fall and, in any case, there is no assurance that such solutions would function in concert and improve the performance of the device. Therefore, it can be stated that, at present, there is no single technique or system which will alleviate all the aforementioned problems in a simple and reproducible fashion.

SUMMARY OF THE INVENTION

It is therefore the primary object of the present invention to provide an improved optical waveguide which is capable of decreasing the level of in-plane scattering caused by surface irregularities, reducing the difficulty of coupling light into and out of the waveguide, performing as a TM mode filter and increasing the intensity of light which can be focused into the guide beyond the limits imposed by the optical damage resistance of a strictly in-diffused waveguide.

The present invention accomplishes this by providing an optical waveguide comprising an out-diffused optical waveguide section, an in-diffused optical waveguide section, and a narrow transition region intimately connecting the out-diffused waveguide section and the in-diffused waveguide section.

More specifically, the present invention provides a signal processing device such as an integrated optical spectrum analyzer, comprising a substrate, a waveguide in a surface of the substrate, the waveguide having an input edge at one end of the substrate and an output edge at another end of the substrate remote from and opposed to the first edge, a collimating lens toward the input end, a Fourier lens longitudinally spaced from the collimating lens towards the output edge, an intermediate signal interaction device such as a surface acoustic wave (SAW) means, a light source coupled to the input edge in light transmitting relation thereto, and detector means coupled to the output edge in light transmitting relation thereto. The waveguide includes: an input out-diffused waveguide section extending from the input edge towards the output edge, an output out-diffused waveguide section extending from the output edge towards the input edge, and an in-diffused section extending transversely of the substrate and intimately connected to each of the input and output waveguide sections by means of a narrow transition region and having therein a SAW propagation path, the collimating lens and the Fourier lens.

The present invention also provides a simple and reproducible process for forming an in-diffused waveguide section and an out-diffused waveguide section in the surface of a substrate. The method comprises the steps of depositing a layer of a metal on a portion of the surface of the substrate while masking the balance of the surface, heating the substrate at a predetermined temperature below the Curie temperature of the substrate for a first predetermined time interval while exposing the substrate to an Argon gas and water vapour environment to form a metal in-diffused waveguide section on the masked or metallized portion of the surface, heating the surface at a predetermined temperature below the Curie temperature of the substrate for a second predetermined time interval while exposing the substrate to a dry Argon gas environment to form out-diffused waveguide sections on the balance of the surface, and subsequently exposing the substrate to an oxygen environment while permitting the substrate to cool to ambient temperature.

These and other features of the invention will become more apparent from the following description in which reference is made to the appended drawings.

DETAILED DESCRIPTION OF THE INVENTION

The present invention will now be described with reference to one embodiment which may be used to provide an integrated optics spectrum analyzer. However, it is to be understood that the invention has wide application in other areas such as integrated optic circuits, both single and multi-mode, fibre coupled integrated optics substrates, both fibre and integrated optics interferometers, and channel waveguides in Titanium in-diffused LiNbO$_3$ technology. Accordingly, the present invention is not to be considered as being limited to the specific application of an integrated optics spectrum analyzer.

Figure 1:
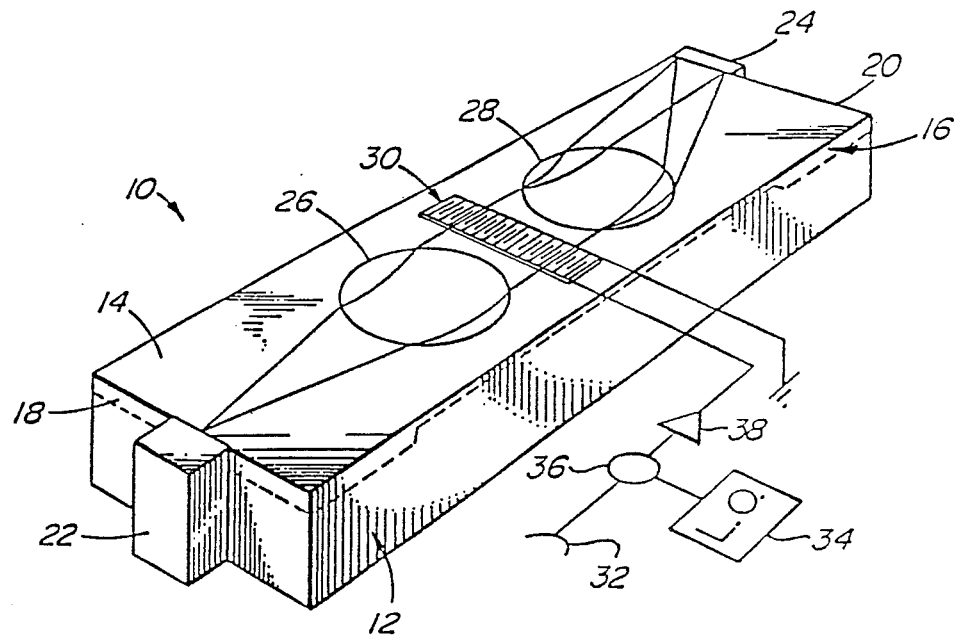
FIG. 1 is a diagrammatic perspective view of an integrated optic spectrum analyzer constructed in accordance with the present invention.

With reference to FIG. 1, there is illustrated an integrated optical spectrum analyzer 10, comprising a substrate 12, formed of Lithium Niobate (LiNbO$_3$), having a surface 14 in which the waveguide 16 of the present invention is formed. The waveguide is formed with an input edge 18 at one end of the substrate and an output edge 20 at the other end of the substrate remote from and opposed to the first edge. A light source 22, such as a laser diode, is coupled to the input edge in light transmitting relation thereto while a detector means 24 is coupled to the output edge in light transmitting relation thereto both in well known fashion. The waveguide further includes a collimating lens 26 and a Fourier lens 28 longitudinally spaced from the collimating lens towards the output edge. A surface acoustic wave (SAW) means 30 is secured to the waveguide in transverse relation thereto between the collimating and Fourier lenses in well known fashion.

As is also well known, an electrical signal to be analyzed is input at 32 and mixed with the output of a local oscillator 34 in a mixer 36. The resulting signal is amplified by an amplifier 38 and applied to SAW means 30 which directs the signal transversely of the longitudinal or optical axis of the waveguide.

Figure 2:
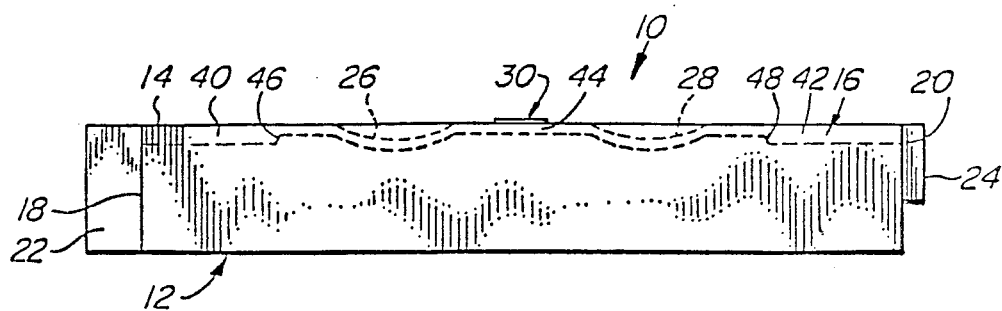
FIG. 2 is a diagrammatic longitudinal side elevational view through the substrate in which a waveguide constructed in accordance with the present invention is formed.

With particular reference to FIG. 2 of the drawings, waveguide 16 will be seen to include an input out-diffused waveguide section 40 extending from input edge 18 towards output edge 20, an output out-diffused waveguide section 42 extending from output edge 20 towards input edge 18, and a titanium in-diffused SAW propagation waveguide section 44 extending transversely of the substrate and intimately connected to each of the input and output waveguide sections by means of narrow transition regions 46 and 48. Collimating lens 26 and Fourier lens 28 are respectively disposed in the in-diffused section 44 on opposite sides of SAW means 30 between out-diffused waveguide sections 40 and 42. The depth of each out-diffused section is made greater than the depth of said in-diffused section by about one order of magnitude.

It will be understood by those skilled in the art that while the transition regions are described as being narrow, the width along the longitudinal or optical axis of said waveguide of the transition regions must be much greater than the wavelength of the optical signal passed through the waveguide in order to avoid reflection of the signal in the transition regions.

The above described waveguide structure possesses several favourable attributes. It can decrease the level of in-plane scattering caused by surface irregularities in both planar and non-planar surfaces, reduce the difficulty of coupling light into and out of the waveguide, function as a TM mode filter, and increase the intensity of light focussed into the guide beyond the limits imposed by the optical damage resistance of a strictly in-diffused waveguide. In addition, no visible scattering occurs at the transition region. These attributes may be explained in part by the individual characteristics of the out-diffused and in-diffused waveguide sections.

A low loss out-diffused waveguide is created by heating a LiNbO$_3$ crystal for a period ranging from a few minutes to several hours at a temperature near 1000° C. (but less than the Curie temperature of the crystal). Heating the crystal causes the Lithium to diffuse out and evaporate away leaving a region at the surface which exhibits an extraordinary refractive index of refraction slightly higher in value than the bulk crystal index of refraction. The increase in the index allows only TE polarized modes to propagate since the ordinary refractive index of the crystal remains unaffected by the diffusion process.

The resulting waveguide penetrates the crystal substrate much further than in-diffused guides, extending 10 or 20 μm or more into the surface of the crystal. Consequently, most of the energy in the propagating modes lies further from the surface of the crystal than the energy in the in-diffused waveguide modes.

The out-diffused waveguide is also inherently more resistant to optical damage than in-diffused guides for reasons that are not completely understood.

These characteristics may be exploited in the several ways. Because of the deeper mode penetration, the modes are less susceptible to surface imperfections and hence the level of in-plane scattering is reduced. Further, no surface polishing is required to remove diffusion by-products which may appear in the in-diffusion process.

The deeper waveguides also decrease the coupling difficulty since the physical constraints imposed by coupling to a 20 μm thick waveguide are far less stringent than those imposed by a 2 μm thick waveguide. This is a significant advantage when direct butt-coupling is used for input and output coupling. The relatively large waveguide thickness alleviates the axial and transverse laser diode positioning difficulties as well as provides a low divergence beam when light exits the waveguide. Furthermore, coupling to optical fibers could be improved since the fiber core diameter and planar waveguide thickness are more closely matched in size. The inability of out-diffused waveguides to carry TM modes allows the waveguide structure to act as a mode filter for beams passing from the in-diffused waveguide section to the out-diffused waveguide section.

Notwithstanding the aforedescribed advantages, out-diffused waveguides are not suitable media for acousto-optic Bragg interaction because the deep optical mode penetration offers a poor overlap with high frequency surface acoustic waves. The poor overlap results in inefficient Bragg deflection at frequencies nearing 1 GHz and beyond. On the other hand, in-diffused waveguides are ideally suited to this function but suffer from the disadvantages mentioned earlier. Accordingly, the waveguide structure of the present invention combines both types of guides and provides the option of placing the type of waveguide on the crystal where it is the most advantageous to the device as a whole. For example, as described earlier with respect to an integrated optical spectrum analyzer, the edges employ out-diffused waveguides whereas the SAW propagation section and geodesic lenses employ an in-diffused guide.

The fabrication of the waveguide of the present invention is simple, straightforward and readily reproducible. A non-contact mask is used to deposit a layer of titanium on one area of the crystal with a graded thickness transition region of approximately 1 mm in width. The crystal is then placed in a tube furnace where it is heated to 1000° C. while argon gas is bubbled through water and passed through the furnace for a suitable time interval, including the heating up period and up to the first few hours of the diffusion period, at 1000° C. Titanium in-diffusion is well known in the art and, accordingly, the details thereof are not described in detail herein. This forms the in-diffused waveguide on the titanium covered area of the crystal while preventing any out-diffused region from forming elsewhere.

In the next step, the water bubbler is by-passed and only dry argon is used during a time interval, which may range from several minutes to several hours depending upon the desired length of the out-diffused section, so that the out-diffused waveguide can be made on the parts of the crystal surface which was not covered initially with the titanium film. Following this, the argon is replaced by oxygen and the crystal is permitted to cool to room temperature. This procedure results in clear waveguides with no visible transition regions.

The present invention thus provides an improved optical waveguide having reduced scattering of light with more efficient coupling into and out of the waveguide. While only a single embodiment has been illustrated and described, other variations may be made in the particular design and configuration without departing from the scope of the invention as set forth in the appended claims.

What is claimed is:

1. A method of forming an optical waveguide on the surface of a lithium niobate crystal substrate, comprising the steps of:

depositing a layer of a metal on a portion of said surface of said substrate while masking the balance of said surface;

heating said surface at a predetermined temperature below the Curie temperature of said substrate for a first predetermined time interval and simultaneously exposing said substrate to an Argon gas and water vapour environment to form a metal in-diffused waveguide section on said portion of said surface;

heating said surface at a predetermined temperature below the Curie temperature of said substrate for a second predetermined time interval and simultaneously exposing said substrate to a dry Argon gas environment to form out-diffused waveguide sections on the balance of said surface; and exposing said substrate to an oxygen environment while permitting said substrate to cool to ambient temperature thereby forming a transition region intimately connecting said out diffused wave guide section and said in diffused wave guide section, the width of said transition region along its optical axis being much greater than the wavelength of the optical signal passing thru said wave guide and the depth of said out diffused section being greater than the depth of said in diffused section by about one order of magnitude.

2. The method as defined in claim 1 wherein said metal it titanium.

3. The method as defined in claim 1 wherein said second predetermined time interval ranges from several minutes to several hours.

4. The method as defined in claim 1 wherein said out-diffused surface sections inhibit propagation of TM polarized modes.

* * * * *